UNITED STATES PATENT OFFICE.

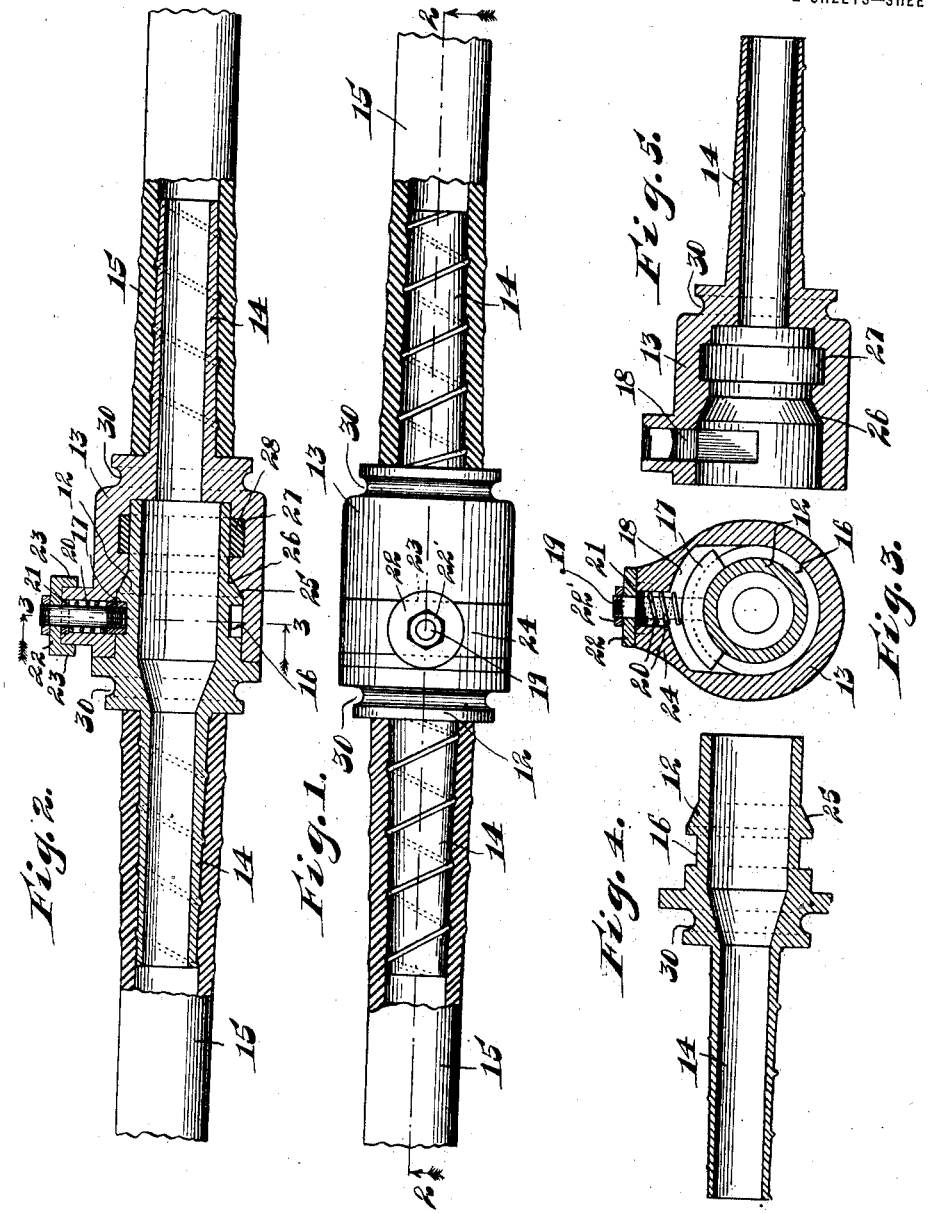

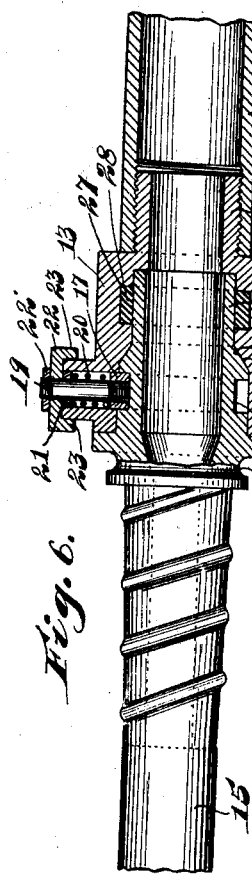

WILLIAM H. KENNEDY, OF CHICAGO, ILLINOIS, ASSIGNOR OF ONE-HALF TO SWIVEL HOSE COUPLING COMPANY, OF CHICAGO, ILLINOIS, A CORPORATION.

HOSE-COUPLING.

1,372,297.  Specification of Letters Patent.  Patented Mar. 22, 1921.

Application filed September 10, 1918. Serial No. 253,355.

*To all whom it may concern:*

Be it known that I, WILLIAM H. KENNEDY, a citizen of the United States, and a resident of the city of Chicago, county of Cook, and State of Illinois, have invented certain new and useful Improvements in Hose-Couplings, of which the following is a specification.

My invention relates to improvements in hose couplings, and has for its object the production of a device of this character, through the medium of which two hose sections or parts may be effectively connected in such a manner as to permit of free relative rotary movement of the parts or sections connected. A further object is the production of a coupling as mentioned, which will permit of ready and expeditious connection of the hose or sections and as ready and expeditious disconnection of the same.

Other objects will appear hereinafter.

The invention consists in the combinations and arrangements of parts hereinafter described and claimed.

The invention will be best understood by reference to the accompanying drawings forming a part of this specification, and in which, Figure 1, is a top plan view of a hose coupling embodying the invention, the hose sections or parts illustrated being shown in section, Fig. 2, a section taken on substantially line 2—2 of Fig. 1, Fig. 3, a transverse section taken on line 3—3 of Fig. 2, Fig. 4, a longitudinal section of the male part of the coupling, Fig. 5, a similar view of the female part of the coupling, Fig. 6, a view similar to Fig. 2, of a slightly modified form of construction, Fig. 7, a side elevation of the construction seen in Fig. 6, with the hose at one side of the coupling shown in section, Fig. 8, an end view of the female part of the coupling, Fig. 9, a side elevation of the locking member of the device, detached, Fig. 10, a side elevation of the rotary head employed for holding the locking member seen in Fig. 9 in inoperative position, and Fig. 11, a bottom plan view of the member shown in Fig. 10, The preferred form of construction, as illustrated in the drawings, comprises tubular male and female coupling parts 12 and 13 respectively, one end of the part 12 being adapted for insertion into and rotatable engagement with the part 13. The remote ends of the parts 12 and 13 are formed with tapering beaded extensions 14 for engagement with the adjacent ends of the hose sections or parts 15 to be connected.

The end of the part 12 engaging in the part 13 is formed with an annular groove 16 with which is adapted to engage a locking member 17 of arcuate form which is radially movable in a recess 18 provided for the reception thereof in part 13. The member 17 is carried at the inner end of an exteriorly projecting radially movable stem 19. The locking member 17 is normally held at its inner terminal of movement, that is, in operative position, engaging with the groove 16, by means of a helical compression spring 20, which is interposed between a stop plug 21 provided at the outer end of recess 18, the inner end of said spring engaging against member 17, as clearly seen in Figs. 3 and 6.

With this arrangement, it will be seen that the member 17, when in engagement with the groove 16, will serve to lock the coupling parts together and in a manner to permit of free relative rotary movement thereof.

Unlocking of the coupling parts is effected by means of a head or disk 22, which is rotatably mounted upon the outer end of stem 19, said head being locked in position upon said stem by means of a nut or stop member 22' fixed to the outer end of said stem. The member 22 affords a sort of grip or handle adapted to be engaged by the fingers in moving the locking member 17 outwardly to releasing position against the tension of spring 20. Provided at the under side of member 22 are depending lugs or projections 23, adapted, upon outward movement of the member 17 to releasing position, and upon rotary adjustment of the member 22, to engage against the outer side of a projection 24 formed upon the member 13, in order to hold the member 17 in inoperative position. Thus, with this arrangement it will be seen that the locking member 17 may be moved outwardly to inoperative position and locked or held in this position by simply pulling outwardly the member 22 and rotating the same to a position in which the members 23 will engage with the outer surface of the portion 24 of coupling member 13. When it is desired to again lock the parts of the coupling member together, it is only necessary to rotatably adjust the member 22 to carry the projections 23 out of engagement with the outer surface of the portion 24, whereupon the spring 20 will act to automatically carry the member 17 to its initial locking position, as seen in the several views. With this arrangement, it is of course apparent that locking and unlocking of the coupling parts may be readily and expeditiously effected.

The snug though rotative fitting of the part 12 in the part 13 insures a tight connection between the parts, but in order to insure a still tighter connection, the outer end of part 12 is formed with an annular inclined shoulder or valve surface 25 which, when the coupling parts are in an operative relation, is adapted to engage against a seat 26 formed in the coupling part 13. Also, the part 13 is formed with an annular groove 27 in which a suitable packing 28 of rubber or other suitable packing material may be arranged to engage against the adjacent cylindrical surface of the part 12.

The form of coupling shown in Figs. 6 and 7 is identical with that shown in Figs. 1 and 2, except that in the form shown in Figs. 6 and 7 the coupling part 13 is provided with a screw-threaded nipple or extension 14' for connection with a metallic pipe instead of a flexible hose as shown in Figs. 1 and 2. Also, in the form shown in Figs. 6 and 7 the member 23 is formed with a hexagonal nut forming portion 29 to afford engagement for a wrench or other tool in applying the coupling to the end of the pipe.

Where the coupling is used in connection with a hose, a clamp will probably be employed to insure secure fastening of the hose to the coupling parts, and in order to afford connection of the clamp with the coupling parts, the latter are formed with annular grooves 30 adjacent their outer ends, for engagement with the inner ends of the clamps employed.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention, what I claim as new and desire to secure by Letters Patent is:—

A hose coupling comprising a male and a female part adapted to rotatably interlock, said female part being provided with an arched space adjacent one side; means for releasably locking said parts in said interlocked relation comprising a spring-pressed arcuate locking member positioned in said arched space and movable into and out of engagement with an annular groove provided in said male part; an exteriorly projecting stem on said locking member; a rotatably adjustable head on the outer end of said stem; a lug on said female part at the point of passage therethrough of said stem; and projections at the inner side of said head adapted, when said locking member is in engagement with said groove, to assume positions at the sides of and out of engagement with the end of said lug, said projections, upon retraction of said stem and rotation of said head, being adapted to engage against the end of said lug to hold said locking member in retracted position, substantially as described.

In testimony whereof I have signed my name to this specification in the presence of two subscribing witnesses.

WILLIAM H. KENNEDY.

Witnesses:
 JOSHUA R. H. POTTS,
 HELEN F. LILLIS.